(12) United States Patent
Keidar et al.

(10) Patent No.: US 10,738,768 B2
(45) Date of Patent: Aug. 11, 2020

(54) MICRO-CATHODE ARC THRUSTER

(71) Applicant: The George Washington University, Washington, DC (US)

(72) Inventors: Michael Keidar, Baltimore, MD (US); George Teel, Arlington, VA (US); Samantha A. Hurley, Paramus, NJ (US)

(73) Assignee: The George Washington University, Washington, DC (US)

( * ) Notice: Subject to any disclaimer, the term of this patent is extended or adjusted under 35 U.S.C. 154(b) by 428 days.

(21) Appl. No.: 15/630,545

(22) Filed: Jun. 22, 2017

(65) Prior Publication Data

US 2017/0370353 A1 Dec. 28, 2017

Related U.S. Application Data

(60) Provisional application No. 62/353,396, filed on Jun. 22, 2016, provisional application No. 62/366,277, filed on Jul. 25, 2016.

(51) Int. Cl.
*F03H 1/00* (2006.01)
*B64G 1/40* (2006.01)

(52) U.S. Cl.
CPC ........... *F03H 1/0081* (2013.01); *B64G 1/405* (2013.01); *F03H 1/0012* (2013.01); *F03H 1/0087* (2013.01)

(58) Field of Classification Search
CPC ........ F03H 1/00; F03H 1/0006; F03H 1/0087; F03H 1/0093; F03H 1/0012; F03H 1/0081; B64G 1/405; B64G 1/406
See application file for complete search history.

(56) References Cited

U.S. PATENT DOCUMENTS

| | | | | |
|---|---|---|---|---|
| 5,879,518 A | * | 3/1999 | Kuehnle | ................ B01J 19/088 204/164 |
| 8,875,485 B2 | | 11/2014 | Keidar et al. | |
| 9,517,847 B2 | | 12/2016 | Keidar et al. | |
| 2019/0329911 A1 | * | 10/2019 | Kronhaus | ............. F03H 1/0087 |

* cited by examiner

*Primary Examiner* — Gerald L Sung
*Assistant Examiner* — William L Breazeal
(74) *Attorney, Agent, or Firm* — Blank Rome LLP

(57) ABSTRACT

A satellite thruster increases satellite efficiency. The Linear Actuated μCAT has a stepper motor to move the ablative electrode forward. A LabVIEW program and Arduino microcontroller are used to analyze the Linear Actuated μCAT to determine how many steps are required for re-ignition, arc current, and the validity of the feed system. Results from testing show that micro-stepping the stepper motor is an effective way to replenish the cannibalized electrode for propellant.

20 Claims, 18 Drawing Sheets

(a) Second Pulse (b) Third Pulse (c) Seventh Pulse (d) Eighth Pulse (e) Eleventh Pulse

MICRO-CATHODE ARC THRUSTER

RELATED APPLICATION

This application claims priority of U.S. Provisional Applications No. 62/353,396, filed Jun. 22, 2016, and 62/366,277, filed Jul. 25, 2016, both of which are incorporated herein by reference in their entirety.

BACKGROUND OF THE INVENTION

Cube Satellites (CubeSats) are considered the satellites of the future because they are small, low cost, and easy to build. Due to these features many universities and private companies utilize them for research purposes and performing experiments in Lower Earth Orbit (LEO). Small satellite systems are useful for precision work such as formation flying, high resolution imaging, and interferometry because these tasks require small thrust levels to finely actuate the CubeSat position.

Although small satellite systems technology has many benefits, it is held back by its lack of propulsion, and therefore the inability to maneuver itself. The CubeSat boom of the late 1990s and early 2000s has further brought a call for small propulsion systems to outfit these miniature satellites. If they have the ability to orient and propel themselves, CubeSats can be utilized for a wider variety of missions.

Micro electric propulsion systems are an excellent candidate for remedying the lack of propulsion in these small satellite systems, and the Micro-propulsion and Nanotechnology Laboratory (MpNL) of The George Washington University (GWU) has spent the past decade designing micro-thrusters to solve the miniature propulsion system problem.

The Micro-Cathode Arc Thruster (μCAT) system to propel CubeSats was constructed by MpNL to address the problem. The μCAT allows CubeSats to control their attitude, actuation, orbit change, de-orbiting, and movement at a maximum specific impulse of 3000 s. The standard μCAT comprises two electrodes, a cathode and an anode. An arc is created between the two electrodes from an electric pulse sent by a power processing unit (PPU).

The MpNL collaborated with the United States Naval Academy (USNA) to launch the first round of μCATs on a 1.5 U CubeSat to monitor their performance. Four μCATs are integrated into the USNA's Ballistically Reinforced Communication Satellite (BRICSat-P) to perform three maneuvers while at a 500 km orbit. The three maneuvers are: de-tumbling, spin maneuvers, and a delta-v maneuver.

The thruster system is comprised of four thruster heads with their respective PPUs mounted on two thruster head boards and a control unit. Each thruster head faces in the same direction to allow the BRICSat-P to control rotation in the x and z axes. The thruster heads (100) can be seen in FIG. 1.

USNA performed a full functionality test in vacuum by suspending the CubeSat from the ceiling of the chamber, winding the wire around 5 times, and then releasing it to simulate de-tumbling. The wire is wound for the axes of rotation to be in the opposite direction of the thruster firing. Results show that the thrusters firing in the opposite direction slow the rotation rate and accurately control the de-tumbling.

The standard μCAT, which was used on board the BRICSat-P, utilizes a spring system to move the cathode forward to replenish the propellant. The flown design consists of the electrodes seated concentrically with the anode at the center surrounded by a dielectric buffer the cathode encircling the two. See for instance, U.S. Pat. Nos. 8,875,485 and 9,517,847.

SUMMARY OF THE INVENTION

The μCAT is a coaxial system based on a vacuum arc thruster. Vacuum arc thrusters are an ideal means for propelling small satellites because they are lightweight, compact, low power, and provide enough thrust to perform a delta-V.

According to an embodiment of the invention, two metallic electrodes are utilized to create an arc, with a dielectric insulator separator, to ionize the propellant and create a neutral plasma. This compact system is ideal for CubeSats because it requires no large tanks or plumbing system because the propellant is one of the solid electrodes.

In addition, according to an embodiment of the invention, the μCAT system is triggerless, which also minimizes the overall volume of the system, and is run by a compact PPU that fits on a Printed Circuit Board (PCB) and can produce impulse bits of approximately 1 μNs or better.

Improvement of the μCAT design allows it to become a more viable option for a myriad of small satellites and increases their capabilities. In a standard μCAT, a Teflon® housing encases cylinders connected to the electrodes, including a cathode, along with a helical spring pushing the cathode forward as it ablates because it is duals as the propellant.

According to an embodiment of the improved uCAT, a linear actuator system is designed to replenish the cathode within the uCAT as it ablates during the generation of an arc. The linear actuated μCAT uses a stepper motor to move the ablative electrode forward. The linear actuator system lengthen the lifetime and power of the thruster system.

BRIEF DESCRIPTION OF THE FIGS

Figure 14:
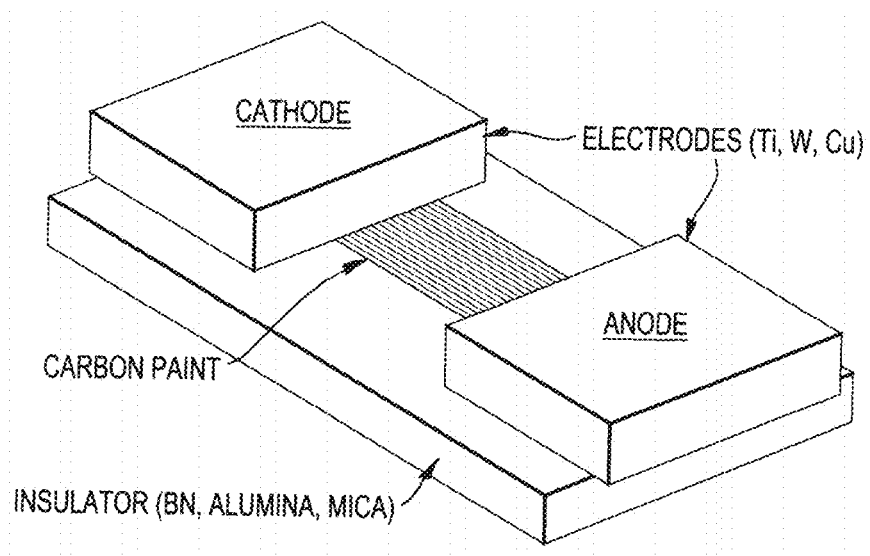
FIG. 14 illustrates a schematic of cathode and anode assembly according to an embodiment of the present invention.
Figure 20A:
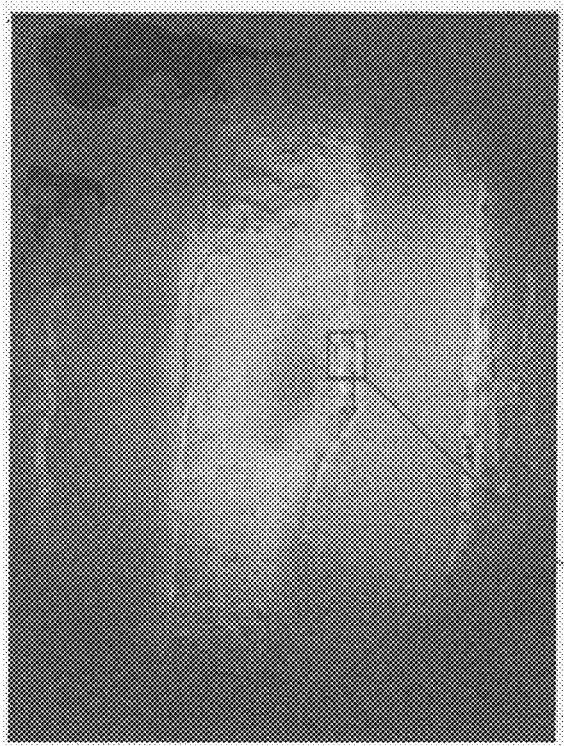
Figure 23A:
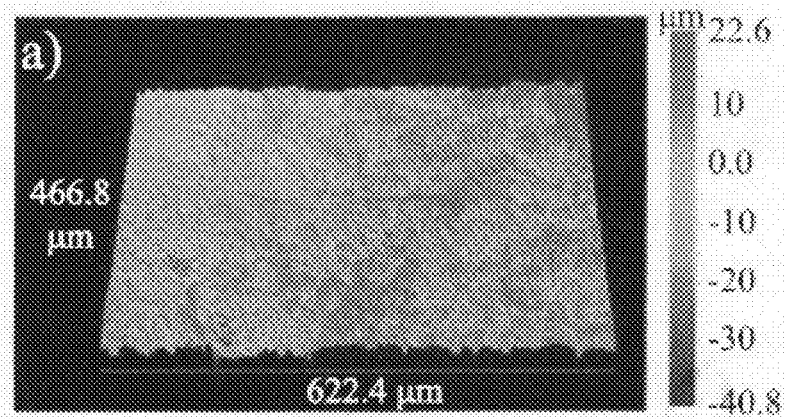
Figure 23B:
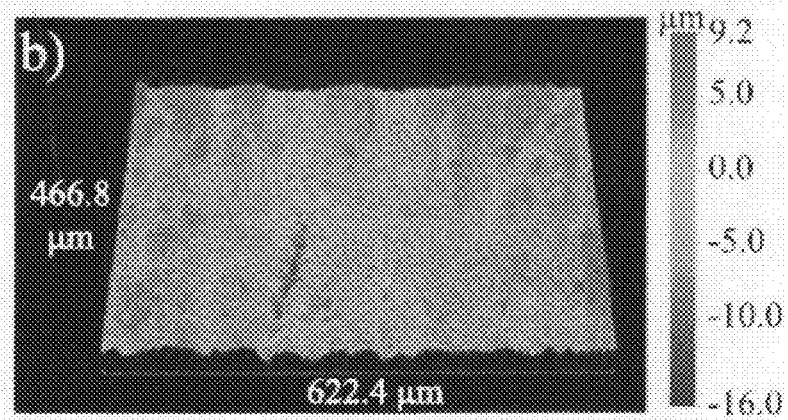
Figure 23C:
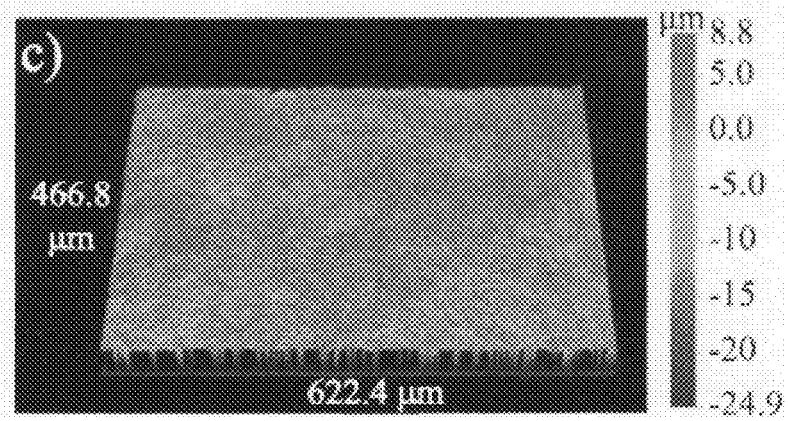
Figure 24A:
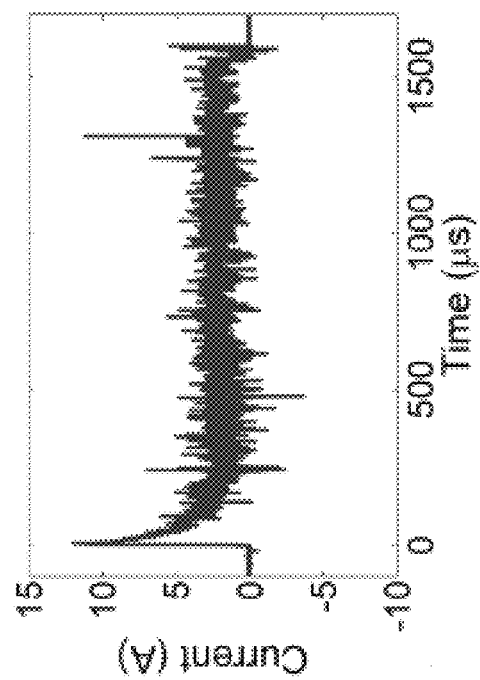

FIGS. 20(a), (b), (c) show magnified SEM and EDX images after arcing;

FIGS. 21(a)-21(e) show EDX images of the cathode-insulator-anode surface of FIG. 14 after individual pulsing;

FIGS. 22(a)-(e) show cathode-anode gap resistance vs. pulse number for various insulator materials;

FIGS. 23(a)-(c) show scanned surface of an insulator for various insulator materials; and FIGS. 24(a), (b) show arc current during operation.

DETAILED DESCRIPTION OF THE PREFERRED EMBODIMENTS

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

According to an embodiment of the invention, μCAT comprises a thruster head. The thruster head has two electrodes, a coaxially seated cathode and anode with a ceramic insulator in between to prevent contact. An arc is created between the two electrodes from an electric pulse sent by the PPU. Due to the vacuum of space no medium is present for the plasma to form in; a thin conducting layer is added to the insulator to produce a vapor for the arc to form in.

The arc forms a localized region of high temperature plasma, or a cathode spot, at the surface of the cathode. The cathode spot follows a circular path along the circumference of the cathode, ablating a small portion of cathode material and generating high velocity, quasi-neutral plasma. The cathode spot has a self-magnetic field which should allow for spot rotation and uniform erosion, but this is not always the case.

To ensure the movement of the cathode spot, a magnetic coil is added to generate an external magnetic field. The magnetic field aides in preventing spot localization and causes the cathode spot to vary in location to permit more efficient plasma plume transportation, an increase in impulse bit and exhaust velocity, and to control the direction of the plasma plume.

The PPU sends the arc signal to the electrodes to generate an arc. The PPU is equipped with an Insulated-Gate Bipolar Transistor (IGBT), which acts as a semiconductor gate. As the voltage is passed through the gate closes to charge the inductor. Once fully charged, the inductor discharges. The length of the trigger signal regulates the energy stored that causes the discharge.

According to an embodiment of the invention of a linear actuated μCAT, as a stepper motor (300) can be used in a μCAT. This allows for more uniform ablation of the cathode by stepping forward as the thruster arcs to maintain consistent pulsing and allows for more efficient use of the cathode. This embodiment is depicted in FIG. 2.

Figure 1:
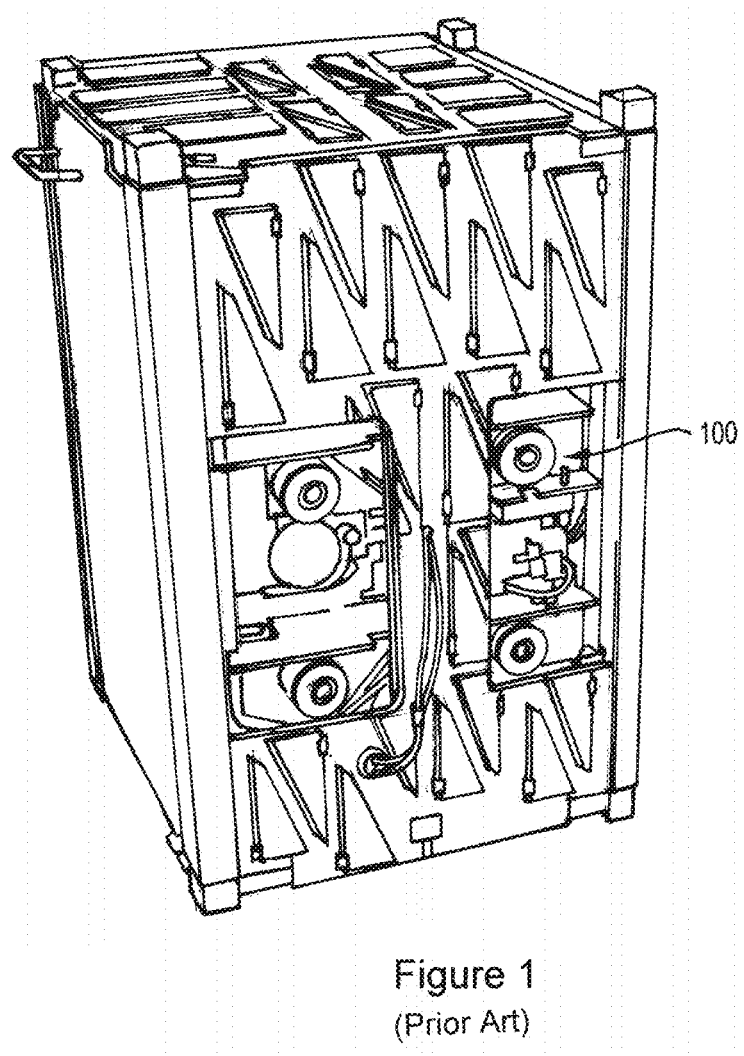
FIG. 1 is an example of a standard μCAT with a helical spring connected to a satellite.
Figure 2:
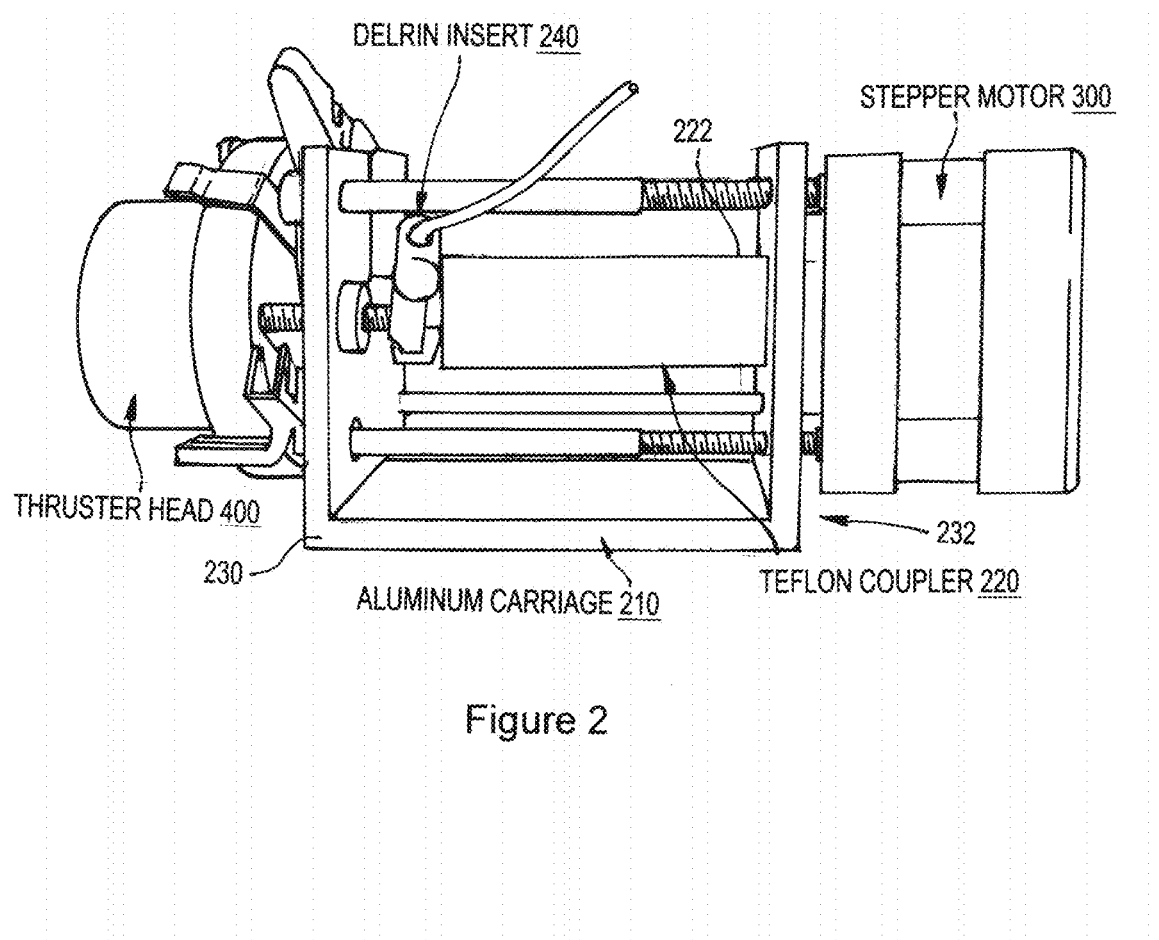
FIG. 2 is a picture a μCAT with a stepper motor according to an embodiment of the present invention.

In the embodiment of FIG. 2, the invention is shown having an advancement apparatus including a motion generator such as a motor (300) and a coupling member or coupler (220). The advancement apparatus controls movement of the cathode (450). A frame such as an aluminum carriage (210) attaches the stepper motor (300) to the thruster head (400) in order for the cathode (450) to be actuated in a forward direction with respect to the anode at the thruster head. The carriage (210) has a distal end (230) and a proximal end (232) opposite the distal end (230), which are connected together by support members that extend from the distal end to the proximal end. The proximal end (232) of the aluminum carriage (210) is connected to the stepper motor (300), and the distal end (230) is connected to the thruster head (400). For instance, the motor (300) can be connected at the outer side of the proximal end (232), and the thruster head (400) can be mounted at the outer side of the distal end (230) of the carriage (210), so that the carriage (210) is positioned between the motor (300) and the thruster head (400).

Figure 5:
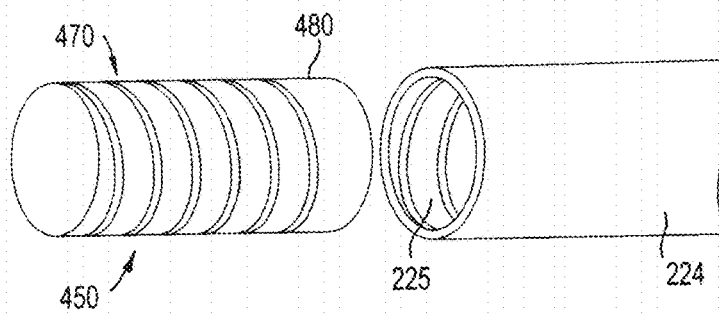
FIG. 5 is an illustration of the proximal end of the cathode and the distal end of the coupler.

As best shown in FIGS. 2 and 5, the coupling member (220), such as a Teflon™ coupler, has a shape of an elongated cylindrical tube having a central bore that is internally threaded to form an internal threaded portion (225). The coupler (220) has a proximal end (222) and a distal end (224) opposite the proximal end (224). The proximal end (222) is fixedly attached to the stepper motor (300), such as by being set-screwed to the shaft of the stepper motor (300). The distal end (224) of the coupler (220) is connected to the cathode (450).

Figure 3:
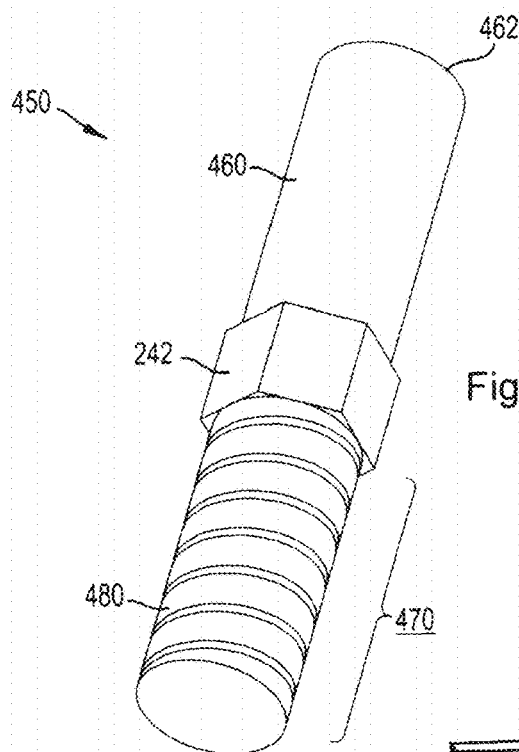
FIG. 3 is a drawing of a cathode in a cylinder shape pursuant to an embodiment of the present invention.

FIG. 3 depicts a stainless steel cathode (450), in a shape of a cylindrical elongated rod in accordance with one example embodiment of the present invention. The cathode (450) has a distal end (460) and a proximal end (470) opposite the distal end (460). The proximal end (470) is threaded to form a threaded portion (480), and the distal end (460) can be smooth. A guide portion (242) separates the distal end (460) from the proximal end (470), and for example can be located at about the middle of the cathode (450). The guide portion (242) has one or more flat sides and in one example embodiment can have a hexagonal shape. The distal end (460) further has a distal face (462) that is transverse to a longitudinal axis of the cathode (450).

Figure 4:
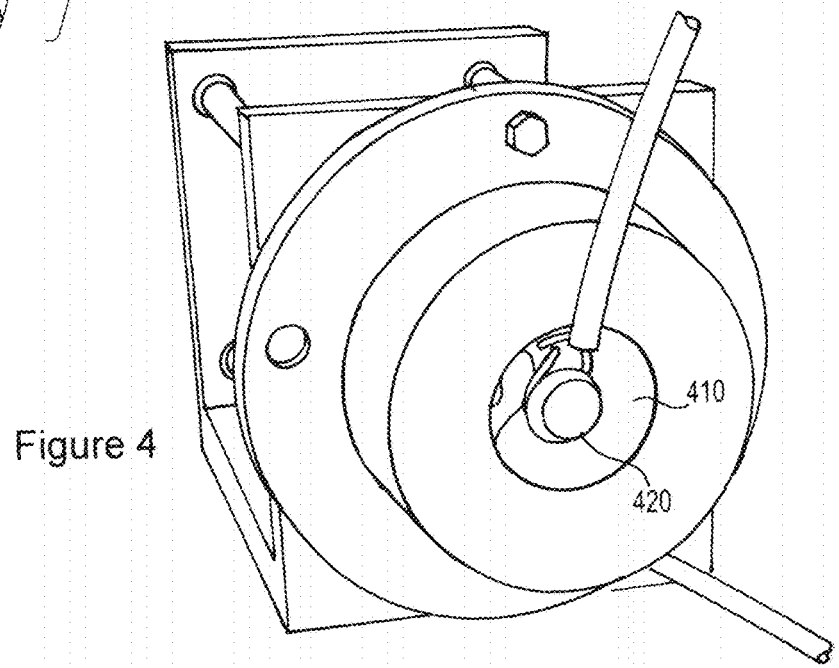
FIG. 4 is a picture of a head of μCAT mounted on a aluminum carriage connected to a stepper motor and showing the distal end face of the anode and of the cathode according to an embodiment of the present invention.
Figure 7:
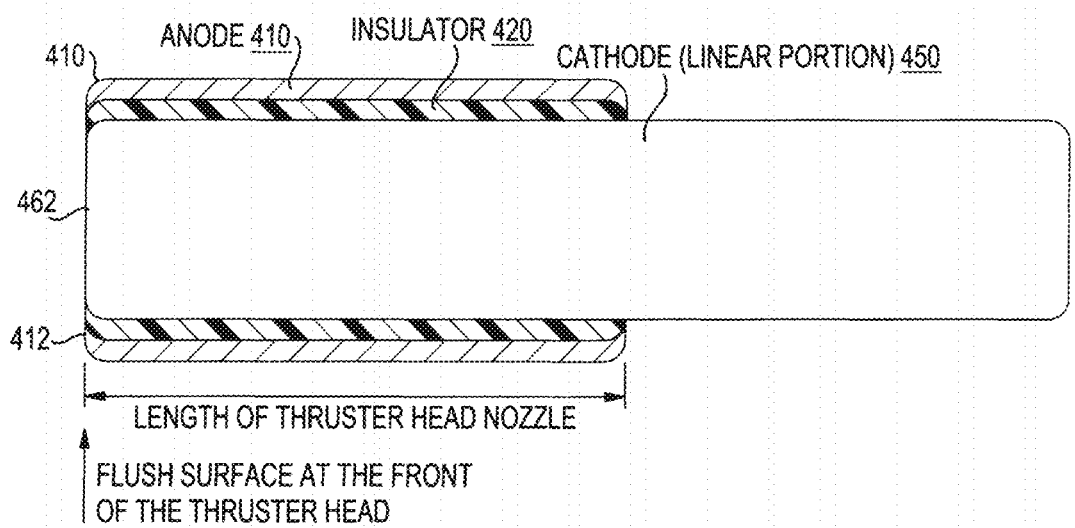
FIG. 7 is a cross-sectional view of the anode, cathode, and insulator.

FIG. 4 depicts an embodiment of the thruster head (400) of a μCAT mounted on the distal end (230) of the aluminum carriage (210) (FIG. 2). Referring simultaneously to FIGS. 4 and 7, the distal end (460) of the cathode (450) is placed in the thruster head (400) surrounded by the insulator (420) and anode (410), which can both be in the shape of a cylinder or tube. Thus, the anode (410), insulator (420) and cathode (450) are all concentrically arranged with the cathode (450) at the center, the insulator (420) surrounding the cathode (450), and the anode (410) surrounding the insulator (420). The anode and the insulator can be substantially the same size and shape, and completely surround at least a portion or all of the distal end (460) of the cathode (450).

The dielectric insulator (420) is placed between the anode (410) and the distal end (460) of the cathode (450) to insulate the anode (410) and cathode (450). The anode can touch the insulator (or can be separated from the insulator), and the insulator can touch the cathode (or be separated from the cathode). However, the anode preferably does not touch the cathode. Thus, the insulator (420) separates the two electrodes so voltage can be maintained.

In the preferred embodiment, the insulator is separated from the cathode by a small gap so that the cathode can slidably move forward and/or rearward (if necessary) (left and right in the embodiment of FIG. 7) with respect to the insulator and anode. The gap is preferably as small as possible so that the cathode remains properly aligned with respect to the insulator and anode and the anode and cathode can form a proper arc discharge. For example the cathode can form an interference fit with the insulator and anode. The insulator doesn't substantially ablate during arcing, so the cathode needs to move forward with respect to both the insulator and anode. The distal and proximal end faces of the anode can also be curved inward slightly to extend over the insulator distal and proximal end faces and prevent the insulator and/or cathode from sliding forward or rearward. And the distal end face of the insulator can be curved inward slightly over the cathode distal end face to prevent the cathode from sliding too far forward.

As further shown in FIGS. 4 and 7, the distal end face or surface (462) of the cathode (450) is aligned with and flush with the distal end face or surface (412) of the anode (410), as well as the distal end face or surface of the insulator (420).

Figure 6A:
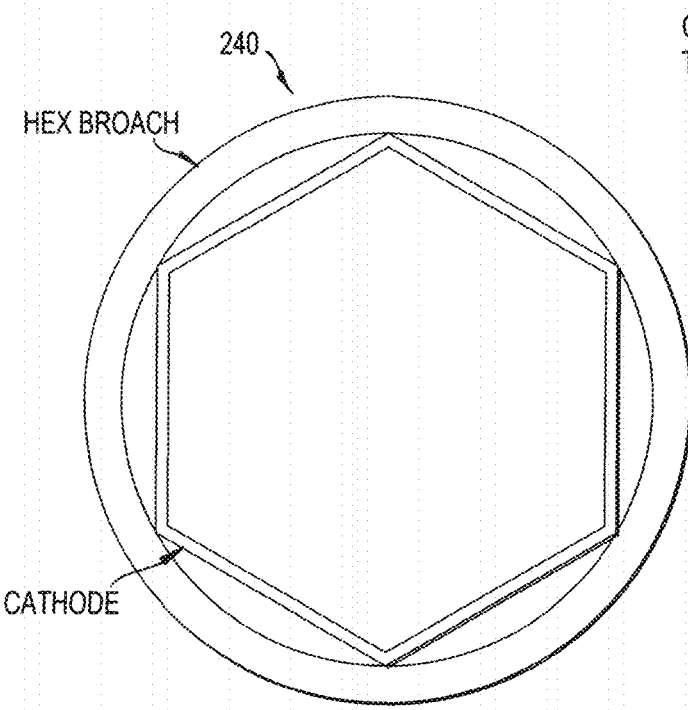
FIG. 6(a) is a front plan view of the insert.
Figure 6B:
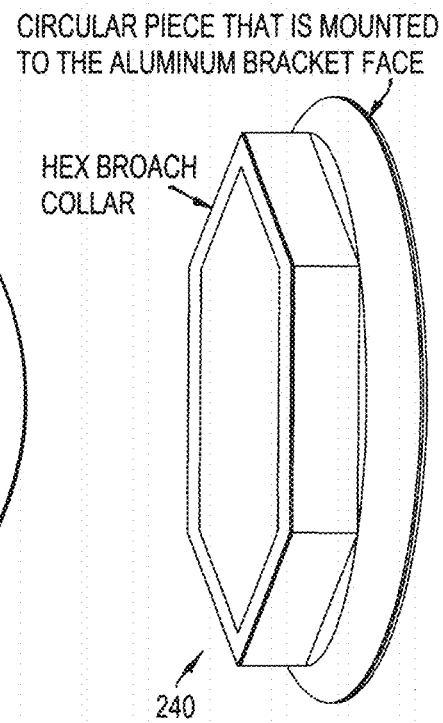
FIG. 6(b) is a perspective side view of the insert.

Referring to FIGS. 2 and 6(*a*), 6(*b*), a linear guide member (240) is provided to guide movement of the cathode (450). In the example embodiment shown, the guide member is an insert (240), such as a Delrin™ insert. The insert (240) is in the shape of a ring with an internal opening that has flat interior sides. In the preferred embodiment, the interior sides have the same shape as the guide portion (242) of the cathode (450) so that the interior sides receive and engage the flat sides of the guide portion (242). Accordingly, there are preferably six interior sides are provided in a hexagonal shape. The insert (240) is fixed to the carriage or frame (210), such as at the distal end (230) or to one of the cross support members toward the distal end (230). The guide member (240) assists the cathode (450) to move linearly forward toward the distal end of the carriage (210). This action maintains the distal end face (462) of the cathode (450) in alignment with the distal end face (412) of the anode (410).

Turning to FIG. 5, the proximal end (470) of the cathode (450) is connected to the distal end (224) of the coupler (220). More specifically, the proximal end (470) of the cathode (450) is in the shape of a cylindrical rod forming a male member, and the coupler (220) is in the shape of a cylindrical tube with a central bore forming a female member. The coupler (220) can be any suitable coupler, such as made of a Teflon™ Preferably, the coupler (220) is not metal or conductive. The cathode (450) has a threaded outer surface with helical ridges on the external surface of the proximal end (470) to form the threaded portion (480). And the coupler (220) has a threaded inner surface with helical ridges in the central bore on the internal surface of the tube to form the internal threaded portion (225). Thus, the coupler (220) matingly engages the cathode (450). The threaded portion (480) of the cathode (450) receives and threadably and removably engage the threaded portion (225) of the coupler (220).

The coupler (220) is fixedly coupled to the stepper motor (300), such as by being adhered to the motor (300) or to a shaft that is part of or fixed to the motor (300). Accordingly, when the stepper motor (300) rotates upon activation, the coupler (220) also rotates. However, the cathode (450) is prevented from rotating because the flat guide portion (242) is received in the fixed linear guide member (240), which in turn is fixed to the carriage (210). Thus, the flat sides of the guide portion (242) engage the similar interior flat walls at the inside surface of the insert (240). As a result, the coupler (220) rotates and the cathode (450) does not, such that the cathode (450) becomes unscrewed from the coupler (220). This causes the cathode (450) to move linearly (without rotation) outward away from the coupler (220) and toward the distal end (210) of the carriage and the thruster head. If necessary, a reverse action can also be performed by the motor to screw the cathode further onto the coupler and move the cathode into the coupler and away from the distal end of the carriage.

Thus, this allows the stepper motor (300) to rotate the cathode (450) so that it moves linearly in a forward direction, i.e., toward the distal end (230) of the carriage (210) and away from the motor (300), at an even rate and by a controlled distance. This moves the cathode (450) linearly to remain at a desired position with respect to the anode (410). The motor ensures that the anode, cathode, and insulator, and particularly the distal end faces (412), (462) of the anode (410) and cathode (450) respectively, are flush at the distal end of the thruster head. The motor (300) can also be controlled to reverse step, causing the cathode (450) to move backward (away from the anode (410)), if necessary. The motor can step move any suitable amount that is predetermined or dynamically determined. The carriage (210) maintains the thruster head (400) and anode (410) at a fixed position at the distal end (230) of the carriage (210). Accordingly in one example embodiment, the cathode can move or be slidably arranged with respect to the insulator and/or anode. The cathode (450) is movably connected at the proximal end (232) of the carriage. Thus, the cathode (450) can be moved with respect to the anode (410).

In operation, the cathode (450) and anode (410) create an arc discharge that is used by the arc thruster to propel the satellite device. At the outset, the anode, cathode and insulator are flush (or the cathode can protrude slightly) at the distal end of the thruster head. Thus, the distal end surface (462) of the cathode is in a plane that is substantially co-planar with the plane of the distal end surface (412) of the anode. However as the arc discharge progresses, the cathode (450), and especially the distal end (460) of the cathode (450), ablates and the distal end surface (462) of the cathode is no longer aligned with the distal end surface (412) of the anode.

According to an example embodiment of the invention, a sensor senses the position of the distal end surface of the cathode to determine the amount of ablation of the distal end (460) of the cathode (450) in the thruster head (400). When the sensor detects that the cathode (450) is below a predetermined value (i.e., too far from the distal face of the anode), for instance, is shorter than the level of the anode (410), it sends a control signal to the stepper motor (300) to step. As the cathode (450) ablates, the stepper motor (300) steps it forward to be in proper alignment with the anode (410) to achieve a uniform or consistent ablation. The cathode (450) can be positioned to substantially remain at a desired location with respect to the anode (410), such as substantially at the center of the anode (410) and the distal end surface (462) of the cathode is level or flush with the distal end surface (412) of the anode (410).

Any suitable controller may be used to control the stepper motor (300). In one example embodiment, the stepper motor (300) is controlled by an Arduino combined with an Adafruit motor controller (Arduino controller). Once the thruster head has ablated the cathode the Arduino signals the motor to step the cathode forward. When the cathode has replenished and is level with the anode and dielectric the stepper motor ceases stepping and the thruster begins arcing again. The motor controller can be located outside of the chamber, and connected to the PPU board on a spacecraft. The controller can be a processing device such as a microchip or the like.

Figure 8:
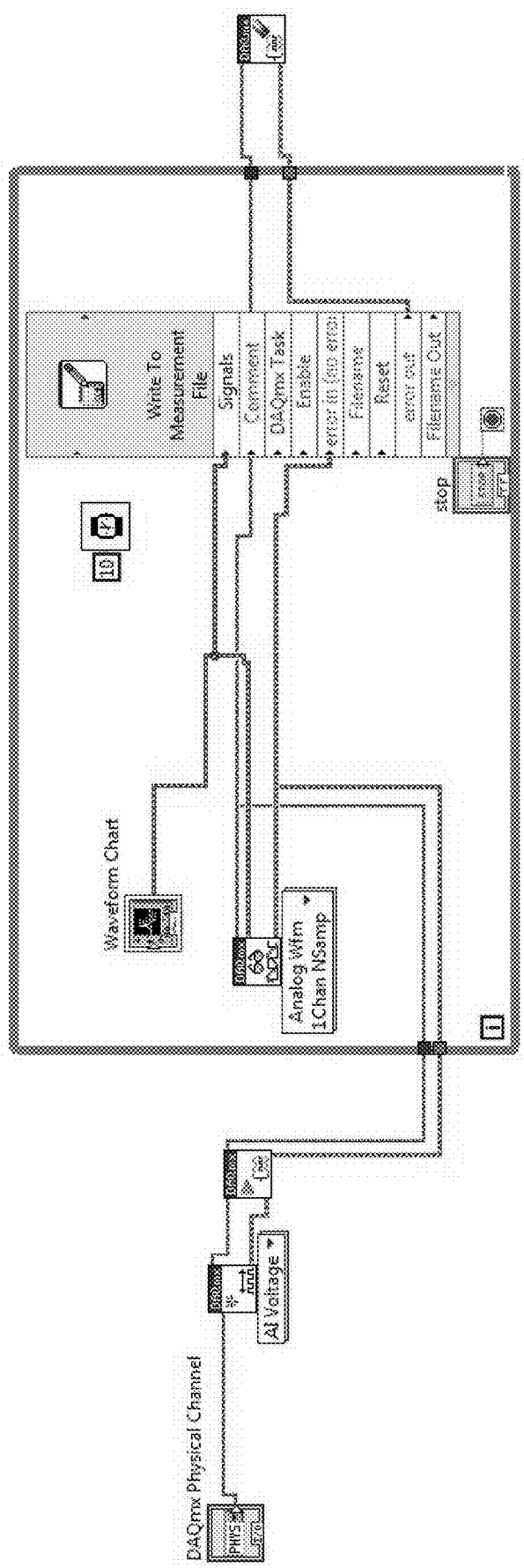
FIG. 8 shows a program used to track the number of times the thruster head according to an embodiment of the present invention arcs.

The number of times the thruster head arced was tracked using an adapted example LabVIEW program. The program takes in the output data to continuously track the change in voltage amplitude. Those values are output to an excel file to be analyzed. The arc voltages are then used to calculate arc current. The oscilloscope and DAQ board measured the voltage amplitude versus time. A LabVIEW program, shown in FIG. 8, is used to see how often the thruster head actually arcs in response to the set 1 Hz.

In one embodiment, an experiment is performed in a vacuum chamber at 1.1e-05 Torr. The PPU, oscilloscope, DAQ board, and Arduino controller are connected outside of the chamber through a series of BNC cables.

The voltage values were recorded as the thruster arced. These values were used to calculate the arc current.

Figure 9:
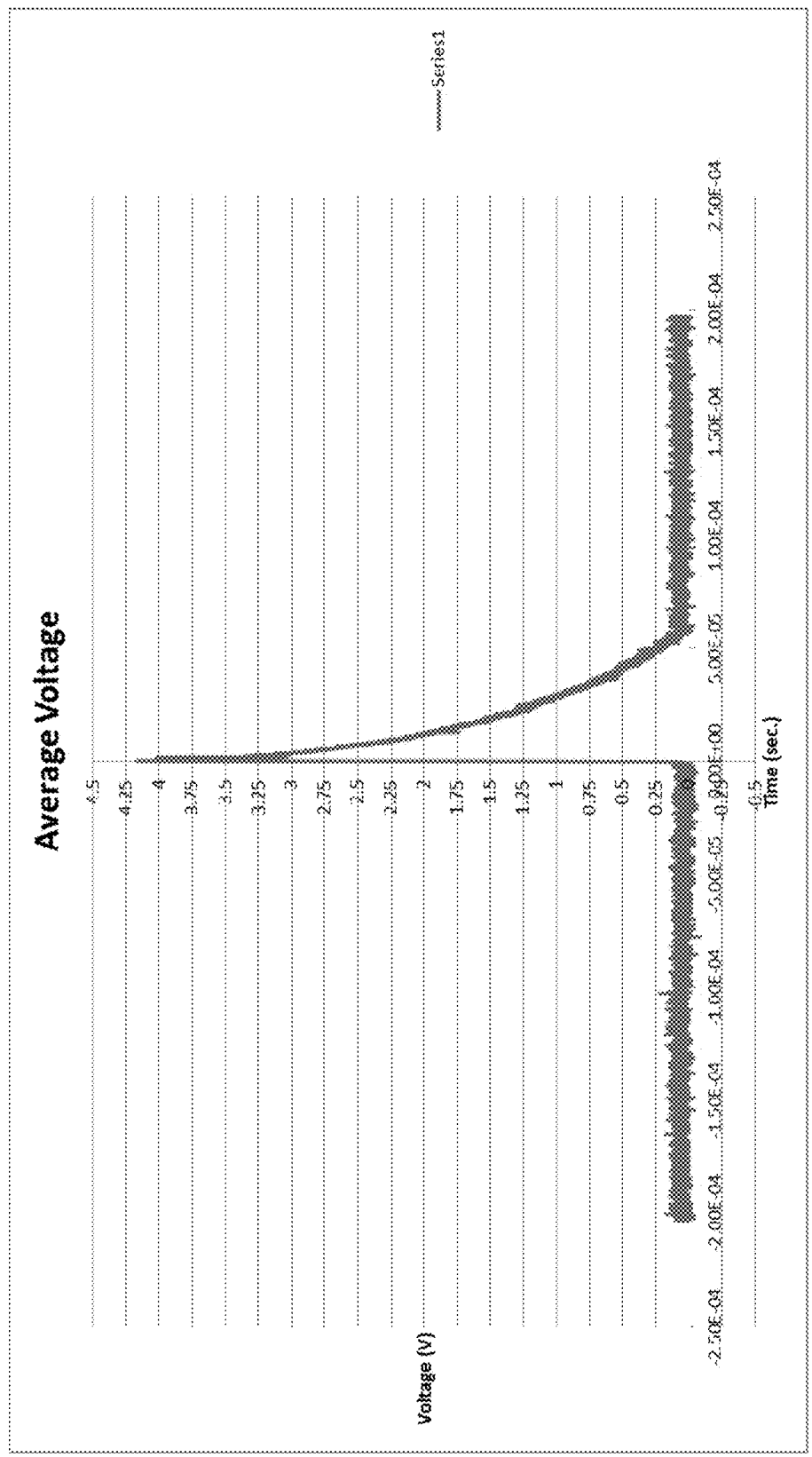
FIG. 9 shows the measurements of voltage values as the thruster head according to an embodiment of the present invention arced.

However, it was determined that there were variations in the duration of ablation, but those times are thought to be attributed to the need for reapplication of carbon paint. The average measured current is 40 Amps. An example curve is shown in FIG. 9.

The first tests performed are preliminary assessments to determine if the linear system performs as intended. The thruster head is arced 100 times and then stepped for a range of revolutions. This test is repeated by arcing the thruster head 200 times and then stepping. It was found that the system works as intended. The thruster head was able to arc at 1 Hz for both 100 and 200 sets and stepped forward to continue ablation.

Figure 10:
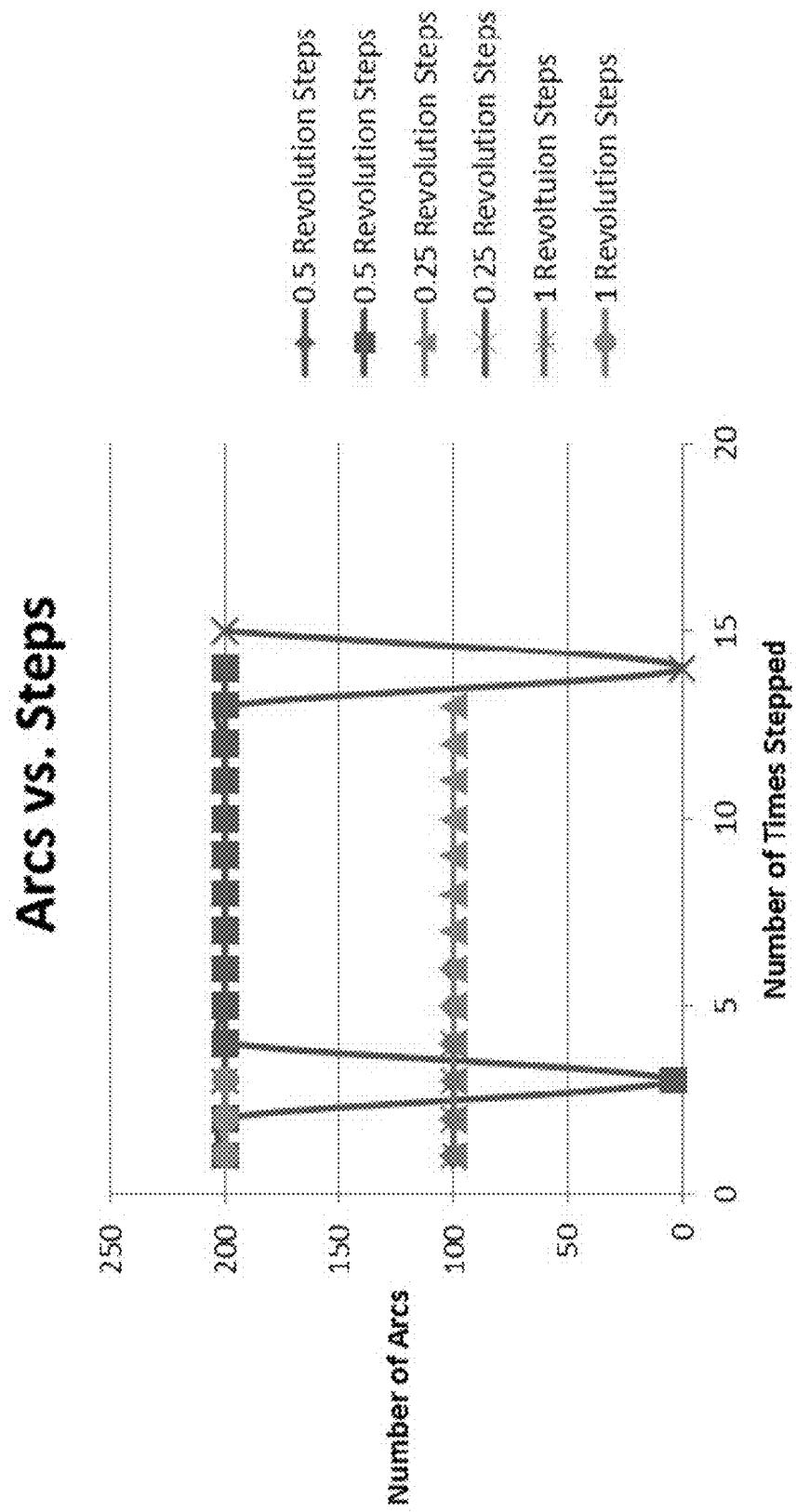
FIG. 10 shows the number of arcs generated in the thruster head according to an embodiment of the present invention in relation to the number of times the stepper motor stepped.

In FIG. 10, it is seen that for 0.25, 0.5, and 1 revolutions of the stepper motor, the thruster head was able to arc as it was stepped. The thruster head arced 100 or 200 times and then was stepped either one quarter, one half, or one full revolution—here one revolution is considered one full 360° turn of the motor spindle. There were two times where the system did not complete 200 arcs, but this was due to the need of reapplication of carbon paint.

The next set of tests were completed to arc the thruster head until it ceased arcing. Periodically, arc voltage measurements were taken and the series over the thruster head's lifetime was averaged, as can be seen in FIG. 10. These measurements were taken using the Mica Film.

Figure 11:
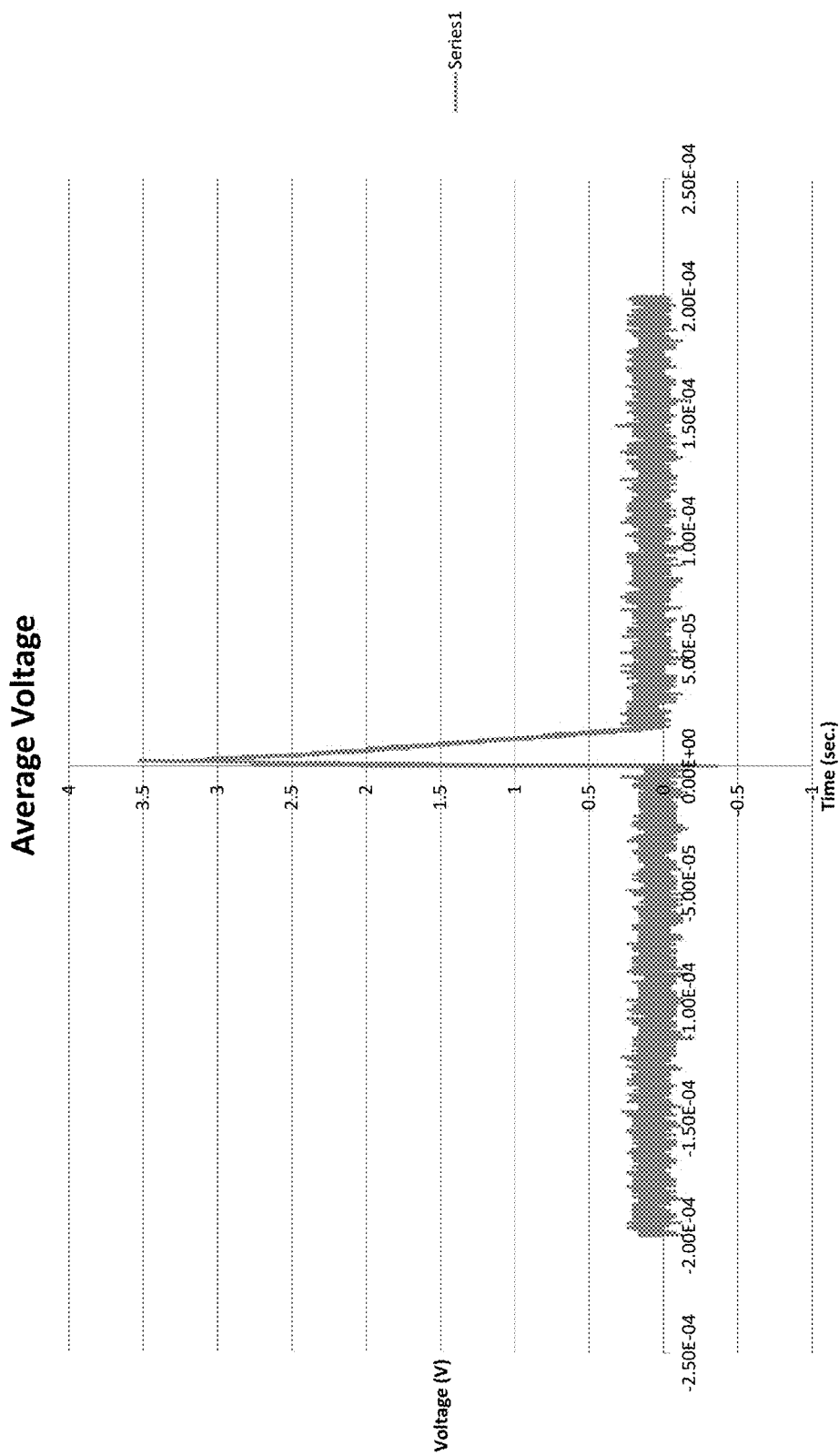
FIG. 11 shows the measurements of voltage values as the thruster head according to an embodiment of the present invention arced.

Following this, the next set of tests were done using a ceramic tube as the insulator. This resulted in an average peak voltage of 3.507 Volts, as seen in FIG. 11. The system was micro-stepped forward after it had eroded and began arcing again for further ablation. Stepper motor "step modes" include Full, Half and Microstep. The type of step mode output of any stepper motor is dependent on the design of the driver. OMEGA offers stepper motor drives. As discussed at omega.com, the stepper motors have switch selectable full and half step modes, as well as microstepping drives with either switch-selectable or software-selectable resolutions, as follows. Standard hybrid stepping motors have 200 rotor teeth, or 200 full steps per revolution of the motor shaft. Thus for full step, dividing the 200 steps into the 360° of rotation equals a 1.8° full step angle. Normally, full step mode is achieved by energizing both windings while reversing the current alternately. Essentially one digital pulse from the driver is equivalent to one step. Half step simply means that the step motor is rotating at 400 steps per revolution. In this mode, one winding is energized and then two windings are energized alternately, causing the rotor to rotate at half the distance, or 0.9°. Although it provides approximately 30% less torque, half-step mode produces a smoother motion than full-step mode. Microstepping is a relatively new stepper motor technology that controls the current in the motor winding to a degree that further subdivides the number of positions between poles. OMEGA microstepping drives are capable of dividing a full step (1.8°) into 256 microsteps, resulting in 51,200 steps per revolution (0.007°/step). Microstepping is typically used in applications that require accurate positioning and smoother motion over a wide range of speeds. Like the half-step mode, microstepping provides approximately 30% less torque than full-step mode.

A set of lifetime experiments are completed to take measurements of the arc current and the real-time pulse frequency. The LabVIEW code records data every 10 ms at 50 s intervals at a frequency of 1 Hz. From these experiments, it is found that the thruster head arcs 30% of the time with respect to frequency. The lifetime length varies throughout the testing, which is assumed to be due to a need of carbon paint reapplication.

Figure 12:
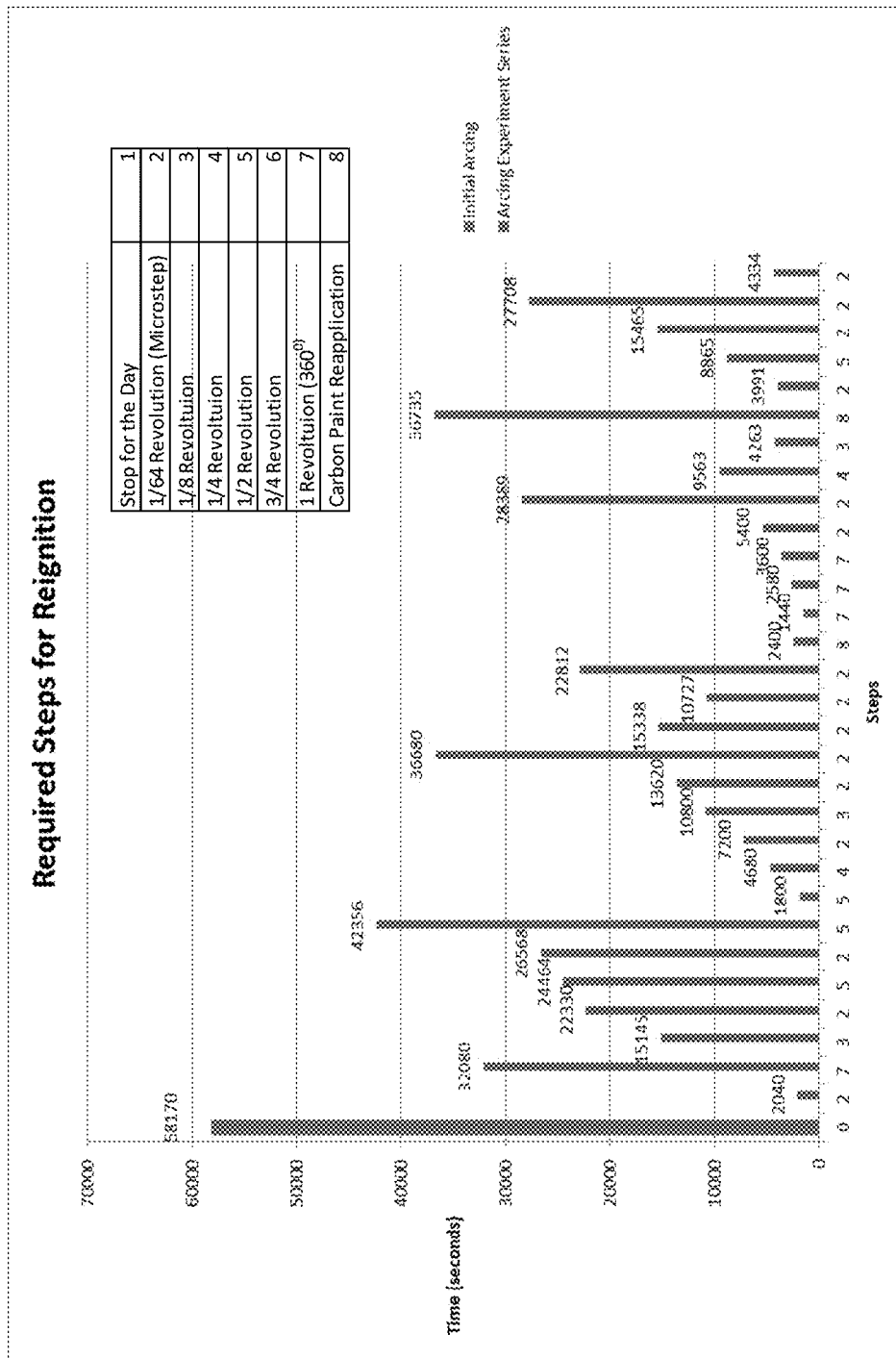
FIG. 12 illustrates a chart showing the amount of steps taken once the thruster ceases arcing to begin again.

The amount of steps taken once the thruster ceases arcing to begin again is displayed on the x-axis in the chart of FIG. 12. The legend at the top right of the chart explains these values. The number on the x-axis that is shown in the legend corresponds to the number of micro-steps (revolutions) required to begin arcing again. The y-axis value denotes how long the successive thruster lifetime test lasted. "Stop for the day" is not displayed on the chart of FIG. 12 because the experiment started from the stopping point the following day.

Figure 13:
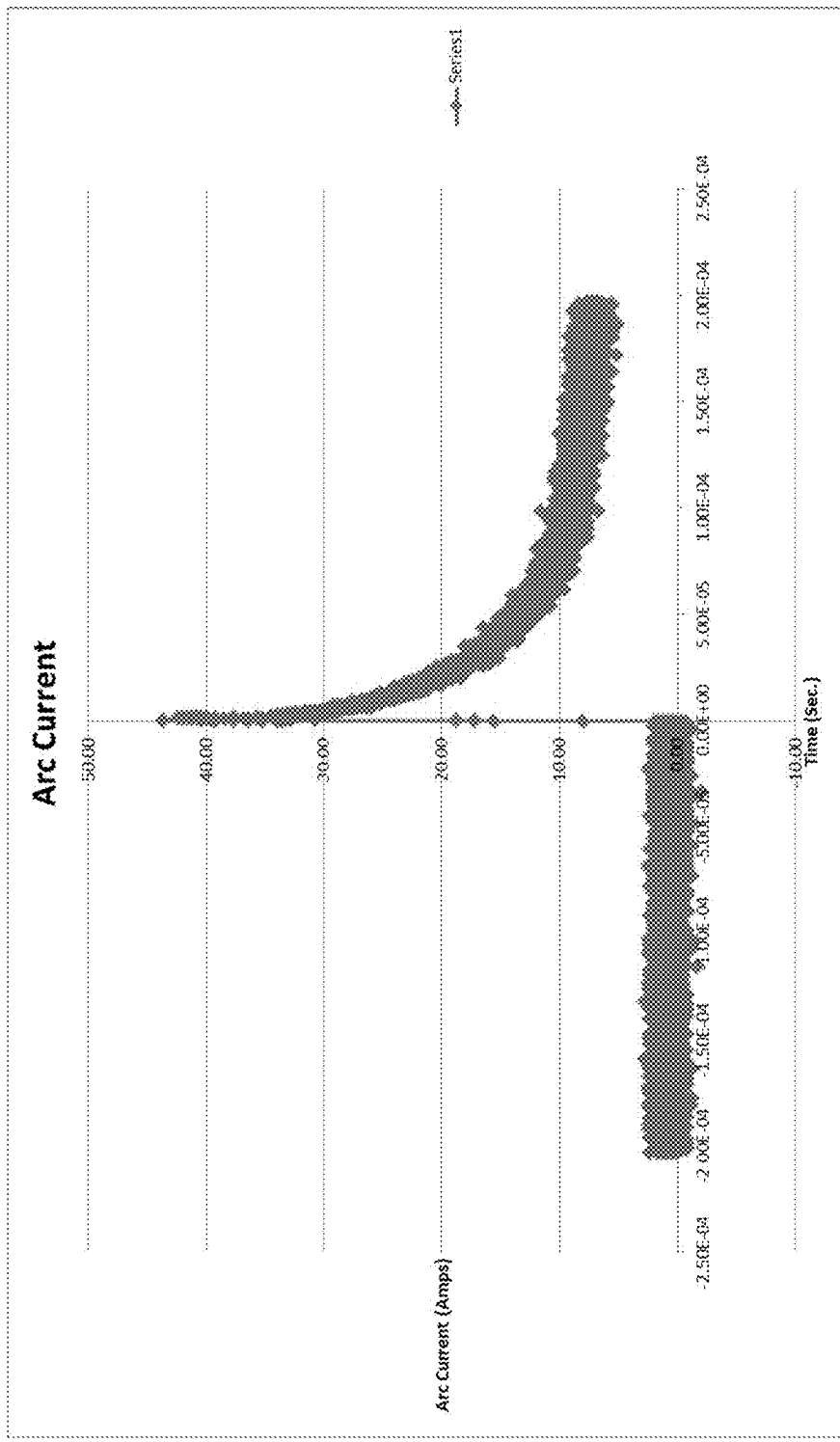
FIG. 13 is a diagram depicting an arc current.

The arc current is measured, shown on FIG. 13, to determine how switching the electrode locations affects the system. For these experiments the arc current is found to be between 40 and 45 Amps. This is comparable to the standard μCAT; therefore, the linear actuated system is working properly.

Several iterations of the thruster head according to the present invention were completed to optimize the system. In one embodiment, the thruster head used Delrin™ as the insulator, but this resulted in a Pulsed Plasma Thrust (PPT). Following this, Mica film was used as the dielectric insulator to separate the anode and cathode, but this was too flimsy. Finally, an alumina tube was settled on as the optimum dielectric insulator, but a solid ceramic tube may also be used as an optimum dielectric insulator.

During the study of the μCAT, it has been found that optimal material selection of the insulator is an important factor during breakdown. Two opposite processes have been found to cycle during operation. The processes are degradation of the conductive film from the inter-electrode interface and re-deposition of the conductive film due to cathode spot erosion. Initial resistances were found to vary from hundreds of ohms to thousands of ohms based on the initial connectivity of the film to the electrodes. After initial breakdown however, resistances have been found to stabilize in a typical pattern. Materials capable of withstanding high temperatures, high pressures, and smooth surfaces are shown to be beneficial for extending thruster lifetime.

A vacuum arc is an electrical discharge between two conducting materials, which occurs in vacuum. Vacuum arcs are realized in various applications such as circuit breakers, ion implantation, and thin film coatings. In the literature, it has been shown that changing minor details of the vacuum arc such as the distance between the electrode's gap, or the types of materials used in the vacuum arc drastically alters breakdown which further proves their reliability, durability, and versatility. Recently, vacuum arcs have been applied as small satellite electric propulsion systems, more specifically propulsion for cube satellites (CubeSats). CubeSats are currently being utilized in a growing number of space missions due to their relative cheap costs and being personal platforms into space.

One such electric propulsion device being flown is the Micro-Cathode Arc Thruster (μCAT). Under development for almost a decade, the μCAT is a low powered, compact, sturdy, and simplistic electric propulsion device. The system utilizes the triggerless arc method, which has been previously developed by Anders for the thin film deposition systems. The system includes two electrodes, anode and cathode, which are separated by an insulator that is coated with a conductive layer. The initial plasma is generated as a result of an explosion at the electrode-insulator interface due to Joule heating. This seed plasma fills the gap between the two electrodes with a conductive medium, which in turn causes the following ignition of the main arc between the discharge electrodes. The μCAT is operating in the cathodic vacuum arc discharge mode, which is associated with energetic plasma jets created by erosion of the material from nanoscale sized craters, known as cathode spots. Cathodic plasma jets naturally produce high velocity plasma with speeds of up to several 10s of km/s. This high exhaust velocity creates specific impulse (ISP) in the 2000-3000 s range. The plasma jets expelled create thrust typically in the range of 10 μNs of thrust per Watt of μCAT operating power. With an added magnetic field the cathode spots travel in a −JxB direction, causing a uniform erosion of the cylindrical cathode, as well as increasing the exhaust velocities. As the cathode erodes, a spring acts as a feeding mechanism, which drives the propellant forward replenishing the thruster.

It was shown that the discharge can be triggered up to $10^6$ pulses. Understanding this mechanism will further provide insight to prolong the μCAT's operational lifetime, which will lead to longer satellite missions. The triggerless ignition has been studied and applied to the μCAT, but the factors limiting the lifetime of the triggerless ignition system have not. This work addresses extreme parameters achievable with the triggerless ignition system and considers the typical failure mechanisms of this approach.

Experiments were conducted under vacuum with pressures roughly around 6 mPa. The triggerless ignition was tested on a simplified system schematically presented in FIG. 14. The setup contains a cathode and anode, both made of rectangular bars of metal, which were resting on an insulator. Sizes of the electrodes typically were varied from 1.5 to 1 cm in length, and 0.5 cm in width. The gap between the electrodes was typically 0.25 and 0.4 cm. Various insulator materials were used, namely, Alumina, Boron Nitride, and Mica. A conductive Carbon Paint (by SPI Supplies) was applied to the insulator's surface.

Figure 15:
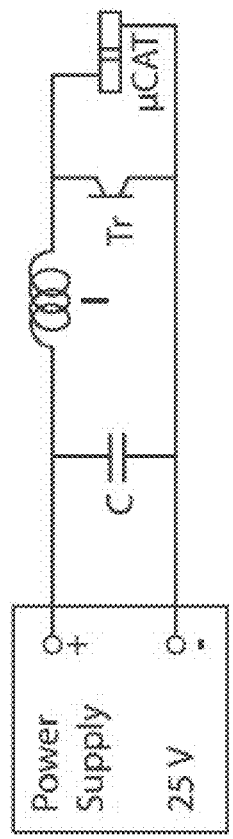
FIG. 15 illustrates inductive pulse circuitry to which the assembly of FIG. 14 is attached.

The anode-cathode assembly was attached to an inductive pulsed circuit which can be seen in FIG. 15. The circuit is mainly composed of an inductor and an Insulator Gate Bipolar Transistor (IGBT). The IGBT acts as an electronic switch, allowing current to flow through the inductor by shorting it, and then rapidly alters current flow towards the thruster. This power supply is described in detail in the previous literature.

Products of the electrode erosion deposited on the insulator surface were analyzed after the anode-cathode assembly arced 500 pulses. The material deposition was then analyzed with a Sigma VP-02-44 Scanning Electron Microscope (SEM) with Electron Dispersion X-ray (EDX) for material composition analysis.

Figure 16:
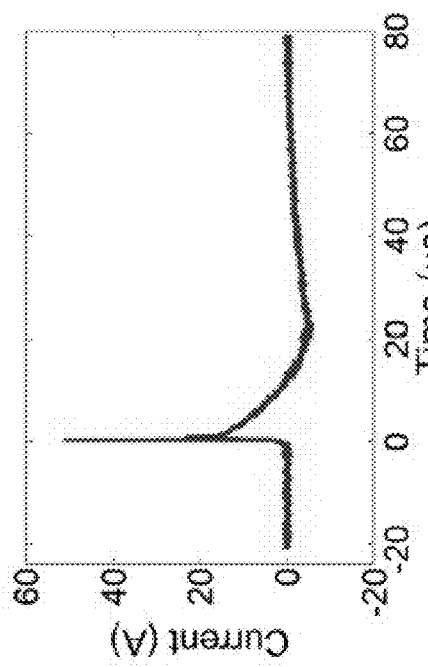
FIG. 16 shows an arc current curve of the μCAT according to an embodiment of the present invention during operation of 500 pulse trials.

FIG. 16 shows the typical arc current of the thruster setup for the 500 pulse experimentation. This measurement was taken with a 5600 series Murata Power Solutions current transformer, which has caused some averaging of the current curve. Voltage characteristics during experimentation were found to follow values in the previous literature.

Figure 17:
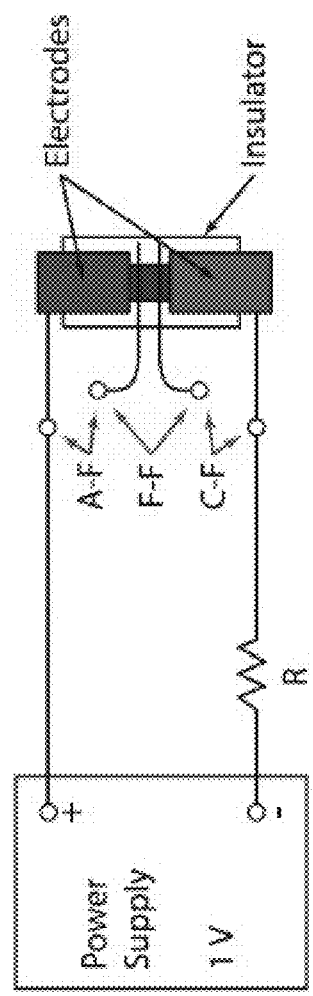
FIG. 17 illustrates 4-point probe system used to measure resistance of the assembly of FIG. 14.

Temporal evolution of the electrical parameters of the anode-cathode assembly over a large number of pulses was also characterized by using 4-point probe electrical resistance measurements, and is schematically shown in FIG. 17. The resistances were measured in three areas, namely, the anode-conducting film interface (A-F), along the insulator's surface film (F-F), and the film-cathode interface (C-F).

Using roughly 1 V from the power supply, current was measured with resistor R, which varied from 20 Ohms to few hundreds of Ohms. Using Ohm's law, voltage was measured over A-F, F-F, and C-F, and then was divided by the current measured across resistor R to calculate the resistance of each interface. To eliminate variability of the results associated with contact resistance, two grooves were cut into the insulator's surface and two thin wires were permanently embedded into them. These thin wires were placed into the insulator surface prior to the conductive coating application.

Figure 18:
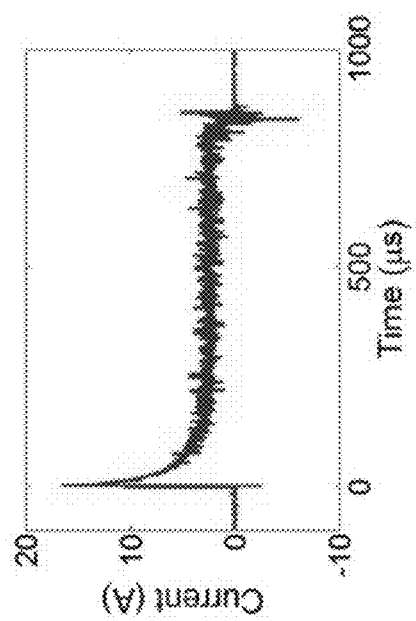
FIG. 18 shows an arc current curve during the resistance testing of FIG. 17.

Arc current was also measured during the resistance testing, with the typical arc current curve shown in FIG. 18. A majority of pulses followed this curve during firing, with variations occurring later in the thruster's lifetime.

Surface roughness of the three insulator materials was measured using a CountourGT 3D Optical Microscope. Surface roughness is shown and based on the surface's Average (Sa) and the surface's Root Mean Squared (Sq) for comparison analysis.

Figure 19A:
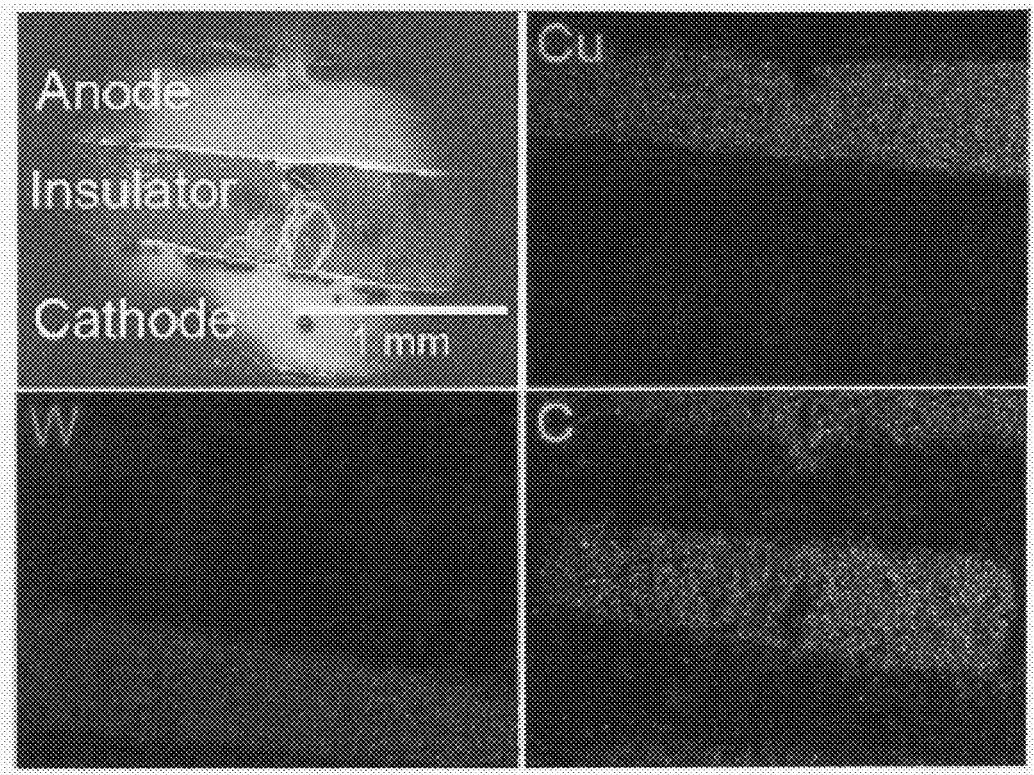
FIG. 19(a) shows SEM and EDX images before 500 pulse trials of FIG. 16.
Figure 19B:
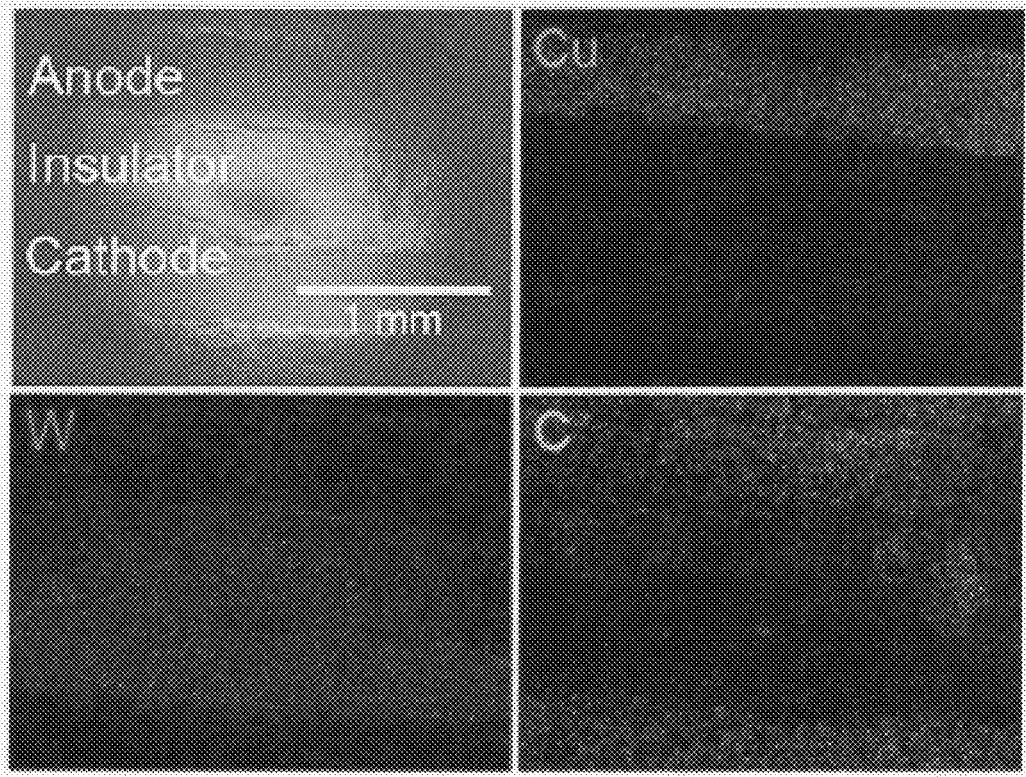
FIG. 19(b) shows SEM and EDX images after 500 pulse trials of FIG. 16.

Post discharge observation of the anode-cathode assembly after 500 pulses has shown a production of natural bi-products. FIGS. 19(a) and 19(b) are SEM and EDX images of the thruster surface before and after arcing. The setup is composed of a copper (Cu) anode and a tungsten (W) cathode (in alternative embodiments, the anode comprises one of Iron, Titanium, Tungsten or Copper and the cathode comprises one of Iron, Titanium, Tungsten or Copper). Starting with the top left image and moving in the clockwise direction are: a SEM image of the electrode assembly, an EDX map of Cu, which is shown in red, an EDX map of the conductive carbon (C) coating, which is shown in green, and an EDX image of the W cathode, which is shown in blue.

FIG. 19(b) is a series of images after breakdown of the same setup as in FIG. 19(a). The insulator's surface has noticeably become coated by both electrodes, and primarily coated by the cathode electrode. This coating on the surface has occurred within just 500 pulses, and within such a limited pulse count, the cathode material has extended across to the anode electrode.

An important issue, however, is the significant change in the insulator's surface. Deep craters are scattered across the insulator, and potential breaks have occurred in the conductive coating due to the ablation. If the insulator's surface loses too much material, then permanent failure is possible. The electrodes in this case may physically lose connection with each other due to this loss of insulator conductivity. This negative effect can be stopped, however, by re-coating from the electrodes such as seen in FIG. 19(b). This large presence of the cathode material (W) covering the insulator's surface can superficially replace the ablated insulator coating. Finally, one must take note of the presence of the carbon material over both of the electrodes after operation, as the conductive film has been eroded and dispersed.

Figure 20C:
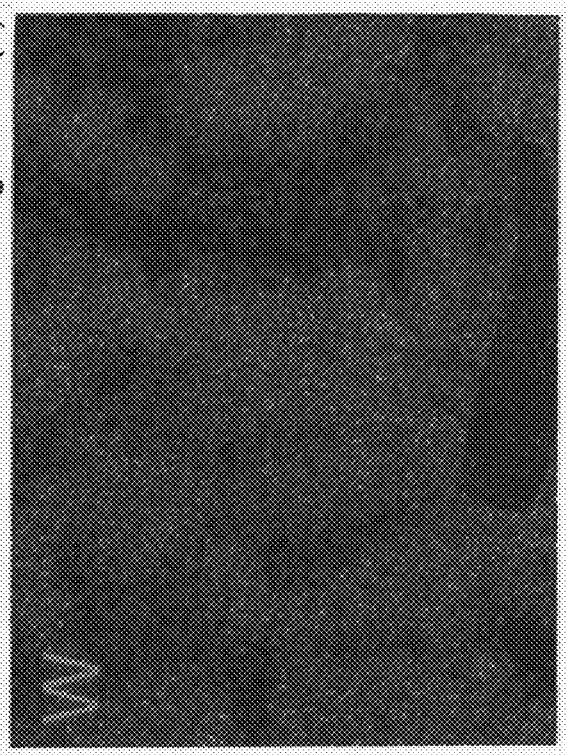
Figure 20B:
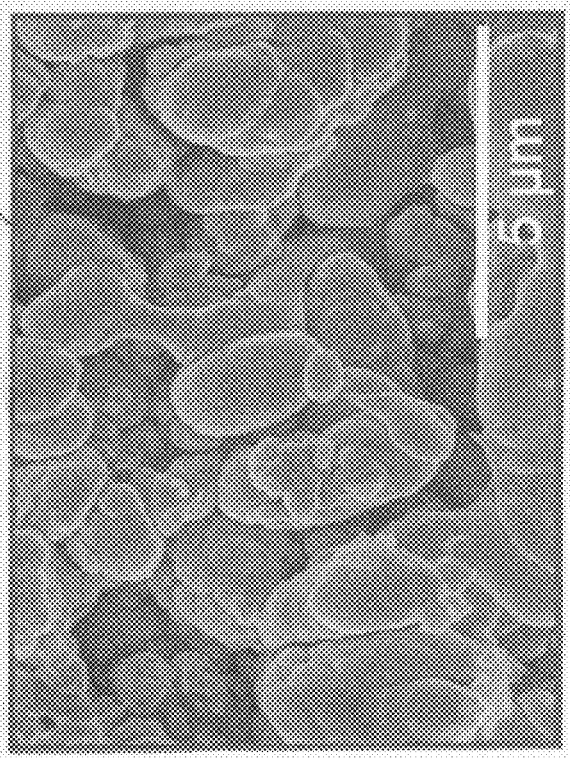

Although the insulator surfaces have eroded, the interior cracks and surfaces have been coated. This coating is shown in FIG. 20. Our hypothesis is that erosion disconnects the electrodes' electrical continuity along the surface between the electrode-film interfaces, or the film surface itself. This ablation destroys the single conductive film, which in turn forms islands of connectivity through micro-whiskers along the surface. If these island chains repeatedly break, then a complete loss of connectivity may develop which would lead to failure. However, shown in FIG. 20 is proof that the islands rebuild themselves due to deposition of cathode material. This coating provides constant connection over and inside the insulator's surface. The degradation shows permanent damage to the insulator's surface however, and if this overall loss of material is too large, then the surface may not be repairable.

Figure 21A:
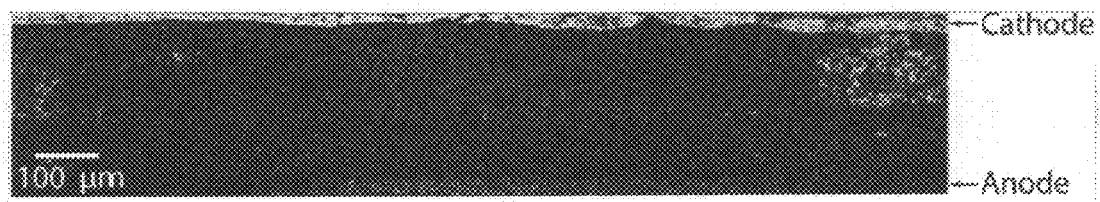
Figure 21B:
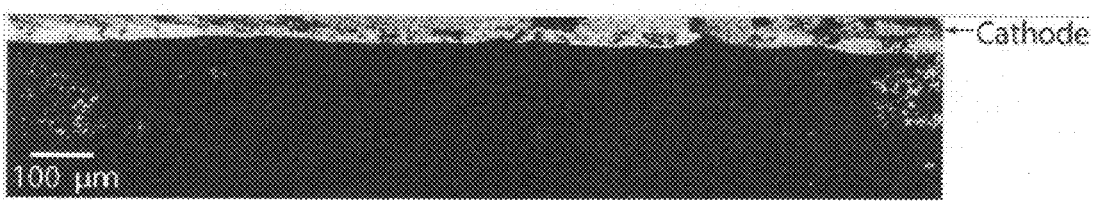
Figure 21C:
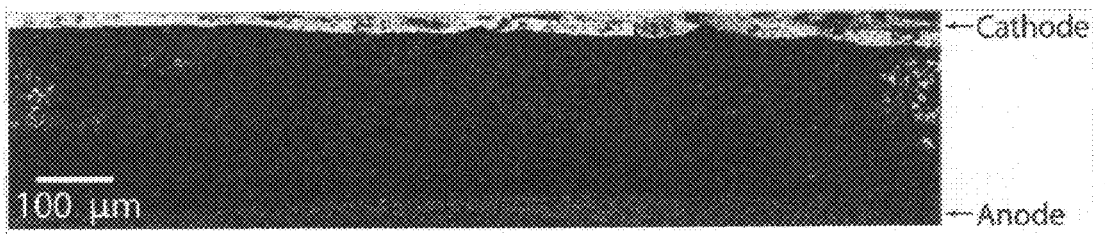
Figure 21D:
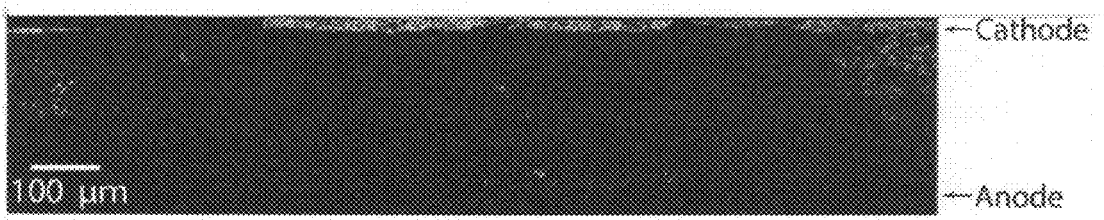
Figure 21E:
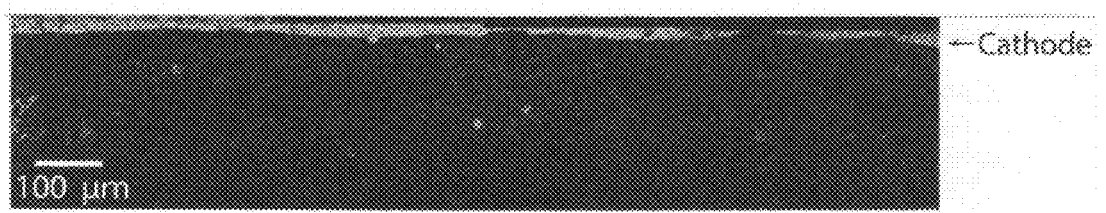

The single pulse analysis has provided insight into the degradation and re-coating cyclic nature of the insulator surface. In FIG. 21, EDX images of the same experimental trial show a progression on a per pulse basis. In this experiment, a Titanium (Ti) cathode and a Cu anode was used. White color represents the cathode (Ti) material and black represents all other materials. The first cycle can be seen in the change between the second and third pulses in FIGS. 21(a) and 21(b). As a build up of material forms on the surface in FIG. 8(a), a loss is then seen during the third arc in FIG. 21(b). The coating then continues to build up to pulse 7 in FIG. 21(c), and further erodes during pulse 8 as seen in FIG. 21(d). Furthermore, the next cycle is seen to build up again in pulse 11 in FIG. 21(e). This provides evidence that breakdown occurs at the highest resistant points, and in these initial cases, the breakdown of the thin coating beginning to form on the surface of the insulator's conductive coating. After further arcing, the coating will eventually create a thin film and overtake the erosion as seen in the previous results.

Figure 22A:
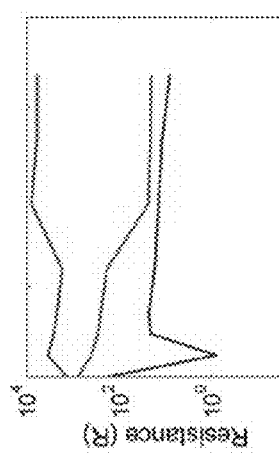
Figure 22B:
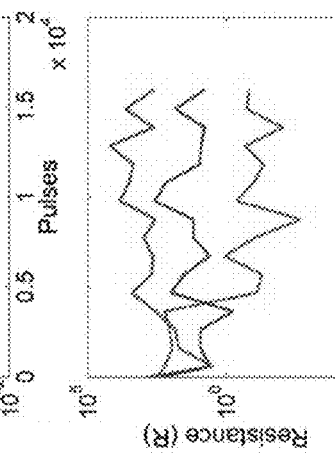
Figure 22C:
Figure 22D:
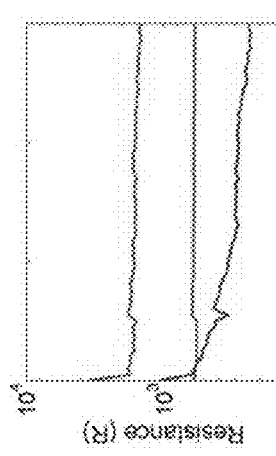
Figure 22E:
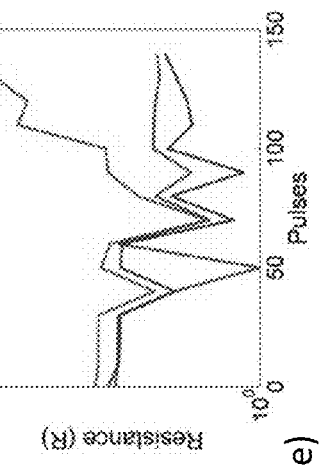

Knowing that during operation the thruster's electrical surfaces go through an ablative and repairing cycle, it is important to characterize this evolution. We have characterized this change by measuring resistance over time. FIG. 22 contains plots of resistance as a function of pulse number in a logarithmic scale for various insulator materials. FIGS. 22(a), 22(c), and 22(e) are short term studies with Boron Nitride, Alumina, and Mica, respectively. FIGS. 22(b) and 22(d) are long term studies with Boron Nitride and Alumina, respectively. The Mica insulator could not survive operation longer than a few hundred pulses; thus, no long term study was done. The anode-film interface (A-F) is shown as red, the cathode-film interface (C-F) is shown as blue, and the insulator's surface film (F-F) is shown as green.

Due to the preparation procedure, initial resistances have differences in values. These deviations are due to different conductive coating thicknesses or can be attributed to where or how well the electrodes are attached to the insulator surface.

Regardless of this variation, however, a pattern has been found to occur. Observing the short term trials in FIGS. 22(a), 22(c), and 22(e), there is a drop in the interface resistances, A-F and C-F, in the initial tens of pulses. This suggests that arcing occurs at both electrode-insulator interfaces, A-F and C-F, and this causes an increase in connectivity.

Another pattern observed in the short term trials between Boron Nitride and Alumina is a form of short term steady state. This stability can be seen in FIGS. 22(a) and 22(c), which allows for continuous operations. What is interesting about the Alumina trials, however, is that the C-F values continuously drop in resistance. This can be attributed to the fusing of the electrodes to the conductive film, when the electrodes are locally overheating and melting the conductive coating during breakdown.

Long term trials paint a different picture however, and the lifetime of the thruster head varies based on the material of the insulator. FIGS. 22(b) and 22(d) show the long term trials with Boron Nitride and Alumina, respectively. Long term firing using Mica was not achievable. These long term trials do not show patterns, but simply show fluctuations. During the trials, the interfaces A-F and C-F would change resistance randomly. The evolution at both A-F and C-F further suggests that breakdown occurs at both electrodes and is based on connectivity. This breakdown at both interfaces is further backed up by FIG. 19(b), which shows the anodic material also deposited across the insulator's surface.

A major note to take away from these longevity trials is the time of failure. Alumina ceramic has proven to be the best insulator choice, rather than Boron Nitride, for vacuum arcs in this flat plate geometry. Boron Nitride consistently failed in the ranges of 10-20 thousand pulses, whereas Alumina consistently surpassed 100 thousand pulses and more.

With the varying performances between materials so drastic, one must further look at the material properties to explain why they act so differently. Starting with Mica as the least effective insulator, we first look at its properties. Mica's surface roughness can be seen in FIG. 23(a), and has the largest surface roughness between all three materials. Table I has Mica's Average Roughness (Sa) measured as 5.284 µm, and the Root Mean Square Roughness (Sq) as 6.774 µm. This roughness makes re-coating difficult to achieve during operation, which hinders the thruster head to repair the broken connections. This particular Mica is made up of multiple thin layers stacked on top of each other. We believe that during operation, the thin layers wear down and break off in large chunks, and are the cause of why FIG. 22(e) shows drastic resistance variations and quick failure.

Boron Nitride is the second best material of the three. The surface roughness of the Boron Nitride used in these experiments is shown in FIG. 23(b), with the Sa as 1.928 µm and Sq as 2.473 µm from Table I. This particular Boron Nitride has a density of 2104 kg/m$^3$, a compressive strength of $1.1 \times 10^8$ Pa, and a thermal conductivity of 1811 J/s/m$^2$/K. Due to Boron Nitride's high compressive strength, and high thermal conductivity, it is believed that the material can withstand the immense heat and pressure during vacuum arc discharge. This resistance to the arc does not last forever, and due to the materials' nature of being formed by sintering, it is estimated that these powdered layers of the boron nitride erode after prolonged exposure during operation leading to failure.

Alumina is the most effective insulator. Long term trials using Alumina consistently lasted beyond 100 thousand pulses, and short term trials show initial stability of both electrode interfaces. One long term study can be seen in FIG. 22(d), in which the thruster head survived 180×10⁵ pulses, and did not fail. FIG. 23(c) shows the Alumina's surface roughness, which is the smoothest of the three insulator materials. The surface roughness values of Alumina, shown in Table 1, are Sa as 1.443 μm and 1.935 μm for Sq. The Alumina used in these experiments has a density roughly of 3875 kg/m³, compressive strengths of 2×10⁹ Pa, and a thermal conductivity of 1104 J/s/m²/K. Alumina has lower thermal conductivity than Boron Nitride, but larger compressive strength and higher density. Therefore, the author believes that due to these features, Alumina can withstand the high temperatures and pressures which occur during breakdown.

TABLE 1

Material's surface roughness based on average (Sa) and root mean squared (Sq) roughness, taken with an optical microscope

| Material | Sa (μm) | Sq (μm) |
| --- | --- | --- |
| Mica | 5.284 | 6.774 |
| Boron nitride | 1.928 | 2.473 |
| Alumina | 1.443 | 1.935 |

Figure 24B:
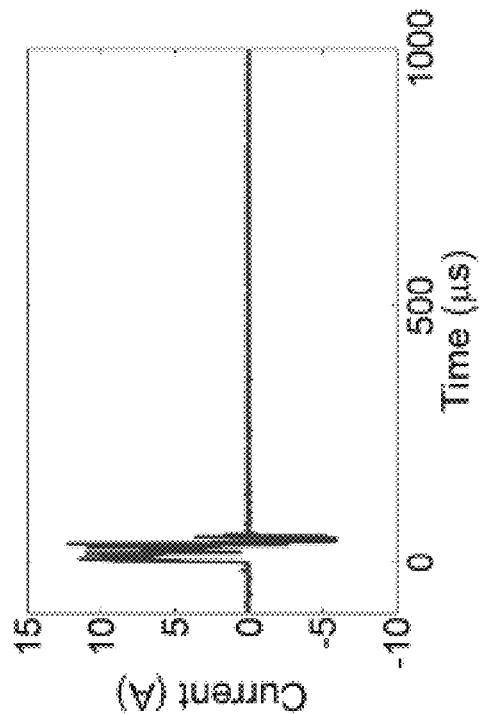

During long term operation after tens of thousands of pulses, the arc current during discharge began to fluctuate. FIG. 24 shows two fluctuations that occurred. It was noticed that when resistance was low, fluctuations seen in FIG. 24(a) would happen. When resistance began to climb or when the thruster head was close to failure, the arc current would fluctuate as shown in FIG. 24(b) and the total discharge time would drop to tens of μs.

It is important to discuss the failure mechanisms of extended thruster operation, as many possibilities occur during the somewhat random generation of plasma. One such scenario could be electrode fusion, where one electrode fuses to the surface. This would cause the conducting film to act as an extension of that electrode. This fusion would inhibit breakdown evenly, and drive the resistance of the other electrode upwards as ablation occurs at the opposite interface. If the connections do not repair themselves, then the resistance becomes too large for breakdown and causes failure of the system.

If both electrodes fuse to the insulator's surface, then erosion of the insulators surface F-F would occur. Constant breakdown on the insulator would cause physical damage to the surface, and wear away the conductive coating. If the plume from the electrodes does not repair this loss, failure occurs.

Another example would be the fusion of both surfaces, and a slow coating of both materials. If this coating becomes too large, both electrodes would short circuit, and possible failure to the subsystem's circuitry itself could happen.

One must not forget a common issue of macro particles generated by the discharge. These large particles can get stuck between the two electrodes and short circuit the entire system as well.

Although negative scenarios are plausible, the reoccurring cyclic stability has been shown. Typically the insulator's surface is ablated, and then optimally repaired by the plasma coating, leading to prolonged thruster life. Thus, it is integral to design the inter-electrode gap with proper selection of insulator materials to achieve prolonged thruster operation.

In conclusion, an investigation of the triggerless arc method utilized in the micro-cathode arc thruster was conducted. A cyclic occurrence of erosion and coating has been observed under SEM and EDX. Erosion happens on the insulator's surface, which must be repaired by the electrode material. It can also be concluded that to obtain a long lasting micro-cathode arc thruster, selection of the insulator material is important. Proper re-coating is needed to repair the inevitable erosion. Breakdown has also been found to occur at both electrode interfaces, as the triggerless method forces breakdown based on the local electrical connectivity.

The description and drawings of the present invention provided in the paper should be considered as illustrative only of the principles of the invention. The invention may be configured in a variety of ways and is not intended to be limited by the preferred embodiment. Numerous applications of the invention will readily occur to those skilled in the art.

For example, the invention has been shown and described as having a cathode that is moved with respect to an anode. However, any suitable arrangement can be provided, such as moving the anode and keeping the cathode fixed. In addition, while the cathode and anode are disclosed as being cylindrical, other suitable shapes can be provided. And while the invention is disclosed for use with a micro-arc thruster and a CubeSat, it can be utilized for other applications as well. And while the cathode is disclosed as being moved by threaded engagement with a coupling device, other suitable configurations can be provided, such as connecting the cathode to a solenoid or other advancement device, or the cathode sliding with respect to the coupling device. And while a motor is disclosed to move the coupling device, other suitable motion generators can be utilized, such as a capacitor or the like.

It is further noted that the description uses several geometric or relational terms, such as cylindrical, linear, and rotate. In addition, the description uses several directional or positioning terms and the like, such as advance, forward, backward, outer, center, interior, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. And, other suitable geometries and relationships can be provided without departing from the spirit and scope of the invention.

Therefore, it is not desired to limit the invention to the specific examples disclosed or the exact construction and operation shown and described. Rather, all suitable modifications and equivalents may be resorted to, falling within the scope of the invention.

The invention claimed is:

1. An arc thruster comprising:
    an anode;
    a cathode;
    an advancement apparatus attached to the cathode comprising:
    a motion generator;
    a coupling device fixedly connected to said motion generator and movably connected to said cathode; and
    a linear guide member slidably connected to said cathode to linearly move the cathode with respect to the anode and prevent said cathode from rotating with respect to said anode.

2. The arc thruster of claim 1, further comprising a dielectric insulator between the cathode and the anode, said dielectric insulator insulating the cathode and the anode, wherein the anode surrounds at least a portion of the cathode.

3. The arc thruster of claim 1, wherein said anode surrounds said cathode, and further comprising a sensor that detects a position of a distal end face of said cathode and a controller for controlling movement of said advancement apparatus, wherein said controller receives the position and controls the motion generator to move said cathode upon sensing that the distal end face of said cathode cathode is greater than a pre-determined distance from a distal end face of said anode.

4. The arc thruster of claim 3, wherein said controller moves the distal end face of the cathode toward the distal end face of said anode until the distal end face of the cathode is substantially level with the distal end face of said anode.

5. The arc thruster of claim 1, wherein said coupling device has a coupling device threaded portion and said cathode has a cathode threaded portion, wherein the coupling device threaded portion of said coupling device is threadably connected to the cathode threaded portion of said cathode.

6. The arc thruster of claim 5, wherein said motion generator comprises a motor which rotates said coupling device to screw or unscrew said coupling device from said cathode.

7. The arc thruster of claim 1, wherein said cathode comprises a rod and said coupling device comprises a tube.

8. The arc thruster of claim 1, wherein the anode comprises one of Iron, Titanium, Tungsten or Copper.

9. The arc thruster of claim 1, wherein the cathode comprises one of Iron, Titanium, Tungsten or Copper.

10. The arc thruster of claim 1, wherein the dielectric insulator comprises one of a ceramic material, Boron Nitride, Mica, or Alumina.

11. The arc thruster of claim 1, further comprising a frame having a proximal end and a distal end opposite the proximal end, wherein said motion generator is connected at the proximal end and a thruster head is connected at the distal end.

12. The arc thruster of claim 11, wherein a distal end face of said anode and a distal end face of said cathode are aligned at the thruster head and provide an arc discharge at the thruster head.

13. The arc thruster of claim 1, further comprising a housing, said advancement apparatus connected to said housing, whereby said motion generator rotates said coupling device with respect to said housing, and wherein said linear guide member is fixedly connected to said housing.

14. The arc thruster of claim 1, said cathode having a guide section with at least one flat surface, said guide section engaging said linear guide member to prevent rotation of said cathode with respect to said anode.

15. A method of operating an arc thruster having a cathode, an anode insulated by a dielectric insulator, a stepping motor and a rod, the method comprising:
providing impulse bits to the cathode and the anode insulated by the dielectric insulator to generate an arc;
sensing a level of ablation of the cathode;
activating the stepping motor connected to the cathode through the rod to actuate the cathode to move linearly forward to compensate for the ablation upon sensing the level of the cathode is below a pre-determined value,
while preventing rotation of the cathode with respect to the anode.

16. The method of operating the arc thruster of claim 15, wherein the rod and the cathode are engaged via helical ridges formed on a surface of an end of the rod and additional helical ridges formed on a surface of an end of the cathode, wherein upon activation of the stepping motor, the helical ridges and the additional helical ridges engage transforming a rotary motion of the rod into a linear motion to actuate the cathode, and wherein a guide member prevents rotation of the cathode with respect to the anode.

17. The method of operating the arc thruster of claim 15, wherein the predetermined value is a value in relation to a level of the anode.

18. The method of operating the arc thruster of claim 17, wherein the stepping motor is activated until the cathode is level with the anode.

19. The method of operating the arc thruster of claim 15, wherein the impulse bits are of approximately 1 uNs or higher.

20. An arc thruster comprising:
a frame having a frame proximal end and a frame distal end;
a thruster head connected to the frame distal end;
a cathode having a cathode distal end with a cathode distal end face;
an anode having an anode distal end with an anode distal end face, said anode surrounding said cathode;
a coupling device movably connected to said cathode;
a motor connected to the frame proximal end and connected to said coupling device, wherein said motor moves said coupling device with respect to said anode whereby said anode distal end face is level with said cathode distal end face; and
further comprising a guide member movably connected to said cathode to move said cathode with respect to said anode and to prevent rotation of said cathode with respect to said anode.

* * * * *